United States Patent [19]

Kanamaru et al.

[11] Patent Number: 4,476,499

[45] Date of Patent: Oct. 9, 1984

[54] VIDEO DISC RECORDING AND REPRODUCING SYSTEM

[75] Inventors: Hitoshi Kanamaru; Toshiyuki Amaya; Kazutoyo Ishiguro; Keiji Masaki, all of Saitama, Japan

[73] Assignee: Universal Pioneer Corporation, Tokyo, Japan

[21] Appl. No.: 486,461

[22] Filed: Apr. 25, 1983

Related U.S. Application Data

[63] Continuation of Ser. No. 286,223, Jul. 23, 1981, abandoned.

[30] Foreign Application Priority Data

Jul. 29, 1980 [JP] Japan ............................... 55-104714

[51] Int. Cl.³ ............................................. H04N 5/76
[52] U.S. Cl. ..................................... 358/342; 360/61; 360/72.2; 360/27; 369/48; 369/32
[58] Field of Search ..................... 358/342, 343, 341; 360/19.1, 72.2, 27, 20, 18, 38.1, 61; 369/47, 48, 49, 50, 27, 28, 30, 91, 96, 98, 111, 32

[56] References Cited

U.S. PATENT DOCUMENTS 3,931,457  1/1976  Mes ..................................... 360/72.2
3,989,893  11/1976  Eisema ............................... 358/343
4,321,635  3/1982  Tsuyuguchi ....................... 360/72.2

OTHER PUBLICATIONS

"A Random Access System Adapted for the Optical Video Disc" by Mathieu, SMPTE Journal, Jul. 1977, vol. 86, pp. 80-83.

Primary Examiner—Alan Faber
Attorney, Agent, or Firm—Sughrue, Mion, Zinn, Macpeak & Seas

[57] ABSTRACT

A video disc recording and reproducing system in which a program is stored on a video disc to eliminate the need for the user to manually input a control program. A program and control signal is recorded in place of at least a portion of one of two audio tracks on a video disc along with video signals. The video disc player of the system includes modulator circuits which demodulate the video and audio signals from the disc, a central processing unit connected to the output of the demodulator circuit for demodulating the audio signal for detecting the control signal and program recorded on the video disc, and a memory for storing the control signal and program. The central processing unit controls the memory for storing the program and control signal at predetermined locations corresponding to the state of the control signal.

9 Claims, 7 Drawing Figures

VIDEO DISC RECORDING AND REPRODUCING SYSTEM

This application is a continuation, of application Ser. No. 286,223, filed July 23, 1981, now abandoned.

BACKGROUND OF THE INVENTION

The present invention relates to a system for recording a video signal, an audio signal and a control signal on a video disc and reproducing them by a video disc player.

Heretofore, video disc players have been provided with the capability of reproducing pictures in a variety of modes such as, for example, a normal play mode in which pictures are reproduced at a normal speed, a reverse play mode in which pictures are reproduced in a reverse sequence, a slow motion mode in which pictures are slowly reproduced, a stop mode in which the picture is stationary, and a search mode in which a predetermined picture is searched for.

In reproducing a specific picture and the accompanying audio information recorded on a video disc in a predetermined sequence, at a predetermined time and in a predetermined mode by a video disc player, a desired program must be selected by a user. The program thus set must be manually inputted into a microcomputer provided in the video disc player and the program executed by the microcomputer.

It is however very difficult for a general user to input a long program. If a different program must be inputted into a microcomputer from time to time, much time is required to reproduce the desired information.

Accordingly, there is known a video disc on which a predetermined program is recorded beforehand, and the video disc is reproduced by a video disc player in accordance with the program thus recorded. However, the length of the program is limited by the capacity of the memory built into the conventional video disc player. Thus, this method cannot be used for a large number of programs or program steps.

SUMMARY OF THE INVENTION

It is an object of the present invention to eliminate the aforementioned drawbacks of the conventional video disc player.

According to the present invention, there is provided a video disc recording and reproducing system in which a program need not be set manually by the user, the capacity of a memory provided in a video disc player can be small, and yet a number of different programs can be rapidly executed.

More specifically, in accordance with this and other objects of the invention, there is provided a video recording and reproducing system including a video disc and a video disc player. Frequency-multiplexed video and audio signals are recorded on a video disc along with a control signal including a program signal which replaces at least part of one of two audio signal tracks. The video disc player has demodulator circuits for demodulating the video and audio signals recorded on the video disc, a signal detection timing circuit connected to an output terminal of the audio demodulator circuit for detecting the control signal, and a memory in which the control signal is stored. The signal detection timing circuit controls the memory to store the control signal when the signal detecting timing circuit detects the control signal and reproduces the video and audio signals from predetermined locations corresponding to the control signal which is stored in a predetermined sequence, at a predetermined time and in a predetermined mode.

DESCRIPTION OF THE PREFERRED EMBODIMENTS

Figure 1:
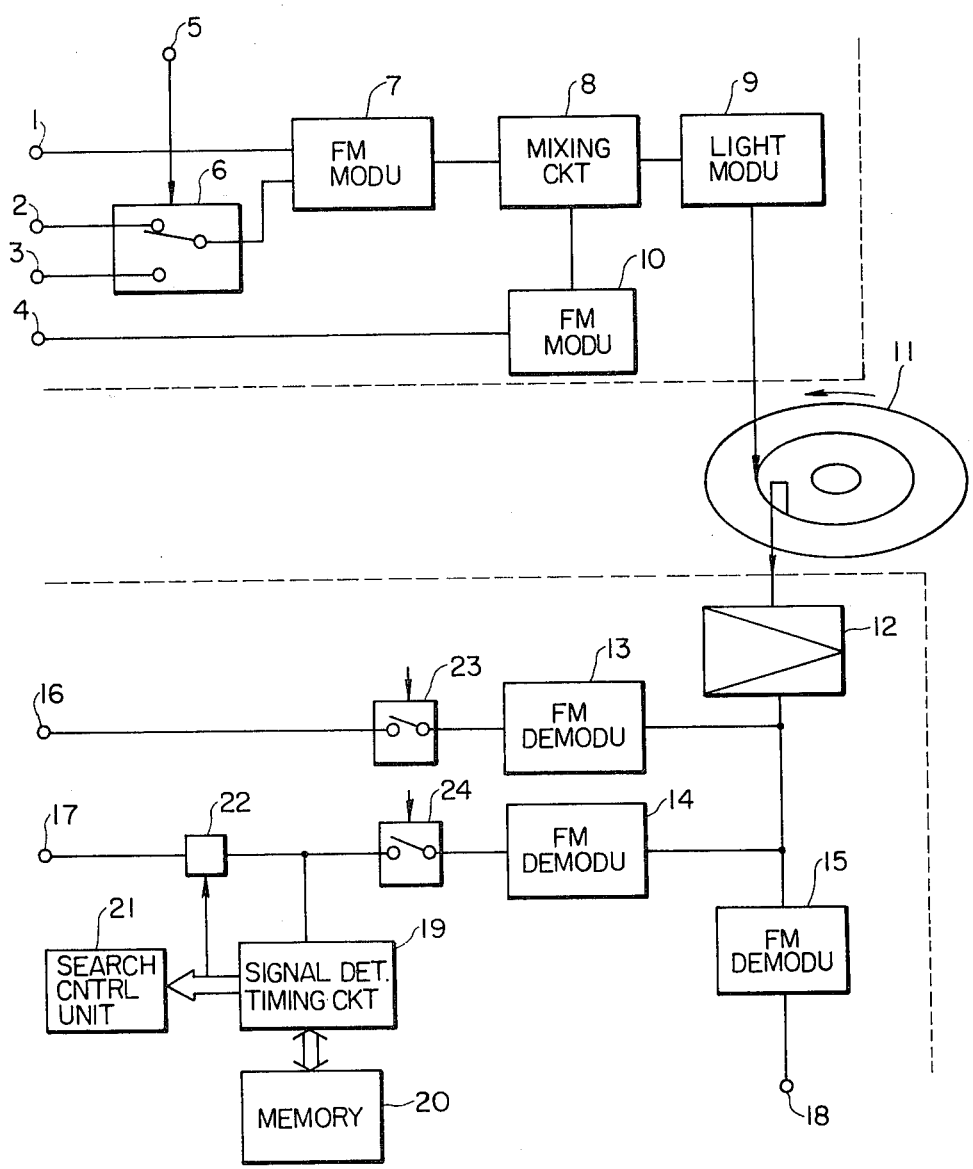
FIG. 1 is a block diagram of a preferred embodiment of a video disc recording and reproducing system constructed according to the present invention.

Reference is made to the drawings, particularly to FIG. 1 showing a predetermined embodiment of a video disc recording and reproducing system constructed according to the invention in block diagram form.

Reference numeral 1 represents an input terminal for a first audio signal, 2 and input terminal for a second audio signal, 3 an input terminal for a control signal such as a program signal, a marker signal or the like, and 4 an input for a video signal.

This embodiment of a video disc recording and reproducing system also incorporates a switching control signal input terminal 5. A switching control signal externally applied to the input terminal 5 is connected to a switching circuit 6 to which the second audio signal is applied from the input terminal 2 and the control signal applied from the input terminal 3. Thus, the switching circuit 6 selectively applies the second video signal from the input terminal 2 or the control signal from the input terminal 3 in accordance with the switching control signal from the input terminal 5.

This embodiment of a system of the invention also incorporates an FM modulator 7 to which the output signal from the switching circuit 6 is applied and the first video signal from the input terminal 1 is also applied. Thus, the selected signal from the input terminals 2 and 3 is applied to the FM modulator 7, which in turn modulates the signal from the input terminal 1 and the input terminal 2 or 3 upon carriers of different frequencies.

The embodiment of the system further includes another FM modulator 10 to which the video signal from the input terminal 4 is applied. Thus, the FM modulator 10 modulates the signal from the input terminal 4 upon a signal of a different frequency from the signal in the FM modulator 7.

The system also has a mixing circuit 8 to which the modulated signal from the FM modulator 7 and the modulated signal from the FM modulated 10 are applied. Thus, the mixing circuit superimposes the modulated video signal from the FM modulator 10 onto the modulated audio signal from the FM modulator 7.

The system further has a light modulator 9 to which the mixed signal from the mixing circuit 8 is applied. The light modulator 9 light modulates with a signal from the mixing circuit 8 a laser beam or the like producing generally a light pulse train output.

Reference numeral 11 designates a recording carrier for recording digital information from the light modulator 9 upon a photoresist or the like as a recording medium. The carrier 11 becomes an original for making video disc copies.

The video disc reproducing system will be described below.

The preferred embodiment of the video disc reproducing system incorporates a pickup 12 which reads a signal recorded on the recording carrier 11 (which includes video discs produced by copying the original disc produced as described above). The signal thus read is in turn applied through respective bandpass filters to FM demodulators 13 and 14 which demodulate predetermined first and second audio signal bands and to an FM demodulator 15 which demodulates a predetermined video signal band. The video signal thus demodulated is outputted to a reproduction output terminal 18 from the FM demodulator 15.

The preferred embodiment of the reproducing system further has an audio switch 23 to which the demodulated first audio signal from the FM demodulator 13 is applied. The audio switch 23 is manually operated so as to be closed when reproduction of the recorded signal is desired and to be opened when not. When the audio switch 23 is thus turned on, the demodulated first audio signal from the FM demodulator 13 is outputted to a reproduction output terminal 16 through the audio switch 23.

The preferred embodiment of the reproducing system also incorporates another audio switch 24 to which the demodulated second audio signal from the FM demodulator 14 is applied. The audio switch 24 is manually operated to be closed when reproduction of the recorded signal is desired and to be opened when not. When the audio switch 24 is thus turned on, the demodulated second audio signal from the FM demodulator 14 is outputted from the audio switch 24.

The demodulated second audio signal from the audio switch 24 is applied to both a signal detection timing circuit 19, and a reproduction output terminal 17 through a switching circuit 22, which will be hereinafter described in greater detail. A memory 20 in which programs are stored is connected to the signal detection timing circuit 19. The signal detection timing circuit 19 is operated to produce output signals to the switching circuit 22, which controls the second audio signal output to the output terminal 17, and also a search control unit 21, which executes a searching function.

It is noted that in the preferred embodiment of the invention thus constructed, since two audio signal channels are generally recorded on a video disc, either channel on the video disc may be used for control signals. Moreover, the light modulator employed in the above embodiment may also be replaced by a mechanical recording device within the scope of the present invention.

The operation of the video disc recording and reproducing system thus constructed will be described.

During disc recording, the switching circuit 6 is switched to connect the second audio signal from the input terminal 2 to the output of the switching circuit 6 in accordance with the switching control signal from the input terminal 5. The second audio signal thus outputted from the switching circuit 6 is in turn applied to one input of the FM modulator 7. The first audio signal from the input terminal 1 is applied to the other input of the FM modulator 7 as described above. Thus, the first and second audio signals are applied, for example, as right and left stereophonic signals thus applied are modulated by the FM modulator 7 and the modulated stereophonic signals are in turn applied to the mixing circuit 8.

On the other hand, a video signal is applied from an input terminal 4 to the FM modulator 10 and is modulated by the FM modulator 10. The modulated stereophonic signals thus applied to the mixing circuit 8 are synthesized by the modulated video signal in the FM modulator 10. The synthesized composite signal from the mixing circuit 8 is in turn applied to the light modulator 9, which sequentially converts the synthesized composite signal into a laser light intensity or the like varying in accordance with the magnitude of the synthesized composite signal. The laser light thus produced from the light modulator 9 is applied to and recorded on a recording carrier 11 driven rotatably by a spindle motor (not shown).

For recording a control signal on the disc 11, the switching circuit 6 is switched to connect the control signal from the input terminal 3 to the output of the switching circuit 6. Thus, the control signal is applied instead of the second audio signal to the FM modulator 7, processed in the same manner as the second audio signal as described above, and is then recorded on the disc 11.

During disc reproduction, the composite signal recorded on the disc 11 is read and reproduced by the pickup 12 which produces a reproduced composite output signal. The reproduced composite signal thus produced is applied to the three FM demodulators 13 through 15, respectively, which demodulate the composite signal from the pickup 12 in predetermined respective bands for first and second audio signals and the video signal.

The demodulated first audio signal from the FM demodulator 13 is applied in turn to the audio switch 23, which is closed when reproduction of the first audio signal from the FM demodulator 13 is desired. Thus, the first audio signal is then applied to the reproduction output terminal 16. The demodulated second audio signal from the FM demodulator 14 is applied in turn to the audio switch 24, which is closed when reproduction of the second audio signal from the FM demodulator 14 is desired. Thus, the second audio signal is then applied to the reproduction output terminal 17. Further, the video signal demodulated by the FM demodulator is outputted to the reproduction output terminal 18.

Figure 2A:
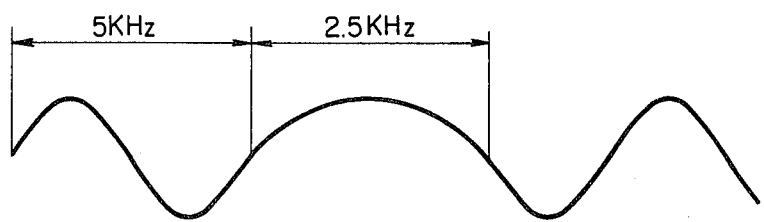
FIGS. 2A and 2B are graphical representations of waveforms of a control signal used in the system of FIG. 1.
Figure 2B:
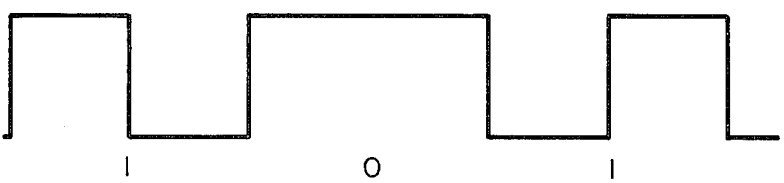

A control signal is generated which, for example, as shown in FIGS. 2A and 2B, has frequencies of 2.5 kHz and 5 kHz corresponding to respective logic states of "0" and "1". The control signal from the input terminal 3 is applied through the switching circuit 6 to the FM modulator 7 which modulates the carrier for the second audio signal with the control signal. The modulated signal is recorded on the disc 11 in the same manner as the second audio signal as described above. The control signal thus recorded is reproduced by the pickup 12 and is in turn demodulated by the FM demodulator 14 and then applied to the signal detection timing circuit 19 through the audio switch 24 in the same manner as the second audio signal as described above. It is noted that if the output signal from the FM modulator 14 is processed through a waveform shaper (not shown) or the like, the pulse control signal indicated in FIG. 2B may be produced and supplied to the signal detection timing circuit 19.

In the control signal, a marker signal is recorded immediately before a program signal. The marker signal may include, for example, a predetermined binary bit pattern after repetitive regular bit patterns. If the marker signal incorporates such patterns, it can easily be distinguished from a general audio signal.

The signal detection timing circuit 19 operates to detect the marker signal thus applied thereto and stores data subsequent to the marker signal as a program signal to be read in the memory 20 at the end of the marker signal.

Figure 3A:
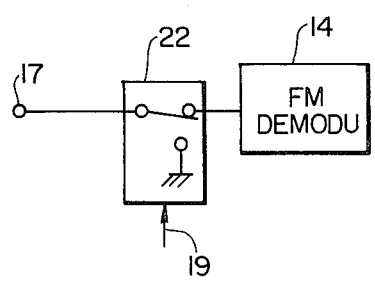
FIGS. 3A and 3B are block diagram of a switching circuit employed in the system of the invention.
Figure 3B:
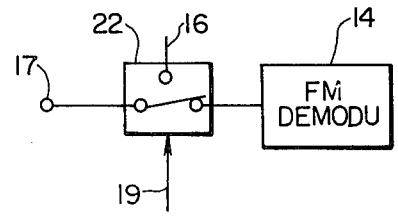

When the program signal is applied directly to the output terminal 17 from the FM demodulator 14, since the program signal is reproduced in a voice frequency band, the signal may be noisy. Accordingly, the signal detection timing circuit 19 is operated to produce a control signal to the switching circuit 22. The switching circuit 22 is thus opened by the control signal from the signal detection timing circuit 19 to thereby mute the demodulated program signal from the FM demodulator 14 as indicated in FIG. 3A until all the data has been stored in the memory 20 through the signal detection timing circuit 19. Further, the demodulated first audio signal from the FM demodulator 13 is also applied through the switching circuit 23 to the output terminal 17 as indicated in FIG. 3B. Thus, only the first audio signal is applied to and is outputted to the output terminals 16 and 17, and the program signal is eliminated.

It is advantageous in that the aforementioned marker signal thus provided makes it possible to multiplex both the audio signals and the program signal. Accordingly, the program signal can be recorded on and reproduced from the disc under the control of the signal detection timing circuit.

In order to identify the end of a reading mode described above, a second marker signal representing the end of a predetermined program signal is, for example, added to the end, or there is provided a system in which the end of the reading mode is detected by the step number of the program with which the signal detection timing circuit 19 operates. It is noted that in the latter case, if the number of steps of the program is less than a preset value, a non-operation command should be recorded at the end of the program. It may further be appreciated that the program can be started automatically after the program is read in the program memory by a processing operation performed with a microcomputer and suitable software.

If the program signal reading mode is not used even if the program signal is recorded on the disc, the audio switch 24 may be operated manually to disconnect the supply of the digital signal to the signal detection timing circuit 19.

It is noted that the foregoing description is directed to a circuit is which the program signal is effectively read and loaded into the program memory 20 employing a control signal such as a marker signal, a program signal or the like. However, the same operational effect is achieved even if the marker signal and the program signal are divided and recorded on a plurality of locations on the disc.

For instance, if a series of long program steps is recorded, the program is divided into a plurality of program segments, and a command which may execute a jump to a predetermined address in which a subsequent program is recorded and may start the reading of the subsequent program after the preceding program has been executed, hereinafter referred to as "a program search command", is recorded at the end of the preceding program. Thus, a new subsequent program is reproduced together with a market signal from the above predetermined address, and the new subsequent program is rewritten in the memory 20 through the signal detection timing circuit 11 in accordance with the above-described operation.

In the case where a branch such as a decision condition or the like is incorporated in the program, it is necessary to load a search command at the same or a different address at the end of the processing routine of the respective branching points. Thus, it is possible to execute a program which requires a large capacity with a small capacity memory 20 by dividing a program into a plurality of program segments, storing the program segments thus divided in the memory 20, executing a preceding program segment, and thereafter sequentially rewriting the subsequent program segment in the memory 20.

It is advantageous in this case that two memories 20 are provided so that, when the program stored in one memory 20 is being executed, the subsequent program is being stored in the other memory 20 with the result that the memories 20 are thus alternately operated, thereby eliminating the interruption of the reproduction of information.

The same or different video and audio signals can be reproduced in different sequences on the same disc to make it possible to apply the invention to a variety of applications by recording a plurality of programs having different contents in different corresponding addresses on the disc and designating the starting address for reproduction for each program.

Figure 4:
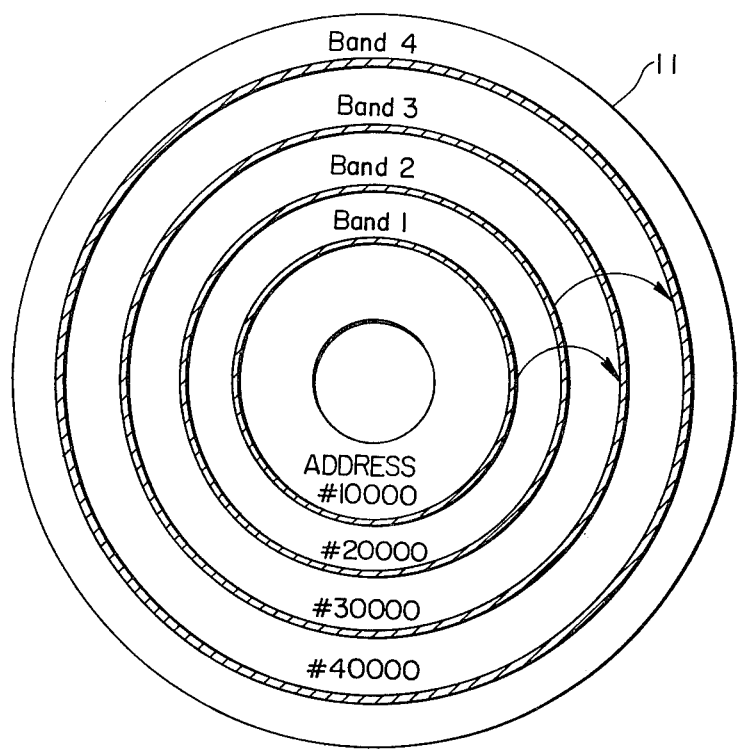
FIG. 4 is a view showing a disc on which two types of program signals are divided and recorded.

Another preferred embodiment of a disc of the invention will be described with reference to FIG. 4. In FIG. 4, a program A is divided into program segments which are recorded in a band 1 (at an address 10000) and in a band 3 (at an address 30000), and a program B is divided into program segments which are recorded in a band 2 (at an address 20000) and in a band 4 (at an address 40000) on the disc 11.

A command for searching for the address 30000 at which the subsequent program segment is recorded and for reading the subsequent program segment at the address 30000 after the execution of the preceding program segment of the divided program A is recorded in the band 1 in which the preceding program segment of the divided program A is recorded. Further, a command for searching for the address 40000 at which the subsequent program segment of the divided program B is recorded and for reading the subsequent program segment at the address 40000 after execution of the preceding program segment of the divided program B is recorded in the band 2 in which the preceding program segment of the divided program B is recorded. In addition, a read inhibit command for inhibiting the signal detection timing circuit 19 from reading the program segments of the divided program B recorded respectively in the bands 2 and 4, which are different from the program A, while the program A is being executed is recorded in the program A. On the other hand, a read inhibit command for inhibiting the signal detection timing circuit 19 from reading the program segments of the divided program A recorded respectively in the bands 1 and 3, which are different from the program A, while the program B is being executed is recorded in the program B.

Accordingly, in the case, for example, where educational information is recorded on the disc, different pieces of information can be reproduced from one disc in such a manner that the information for a beginner is selectively reproduced from the address 10000 on the disc by the beginner and the information for a more advanced student is selectively reproduced from the address 20000 on the disc by the more advanced student.

It is noted that the foregoing description is directed to a circuit in which a search control unit 21 is employed and controlled by the signal detection timing circuit 19. However, a computer, a display unit or the like provided externally of the video disc recording and reproducing system of the invention may also be connected to this system for a variety of applications.

It may be appreciated from the foregoing description that since in the video disc recording and reproducing system of the invention a control signal is recorded on a disc by modulating with the control signal a carrier for the audio signal, drawbacks, such as an increase in the number of parts caused by the necessity for recording the program signal for the control signal with an independent carrier and increases in the cross modulation components to other channel, which results in a low S/N ratio, are eliminated.

It may also be understood that since in the video disc recording and reproducing system of the invention the control signal itself is contained within the audio frequency band, the FM modulators and demodulators may be commonly used and the system can be accordingly simplified in configuration and yet the information is not adversely affected by drop-out. Therefore, the control signal can be stably read from the disc to the memory, thereby lessening the number of erroneous operations. Further, it may also be appreciated that since in the system of the invention the control signal is outputted not as an audio signal in the same channel but as an audio signal in the other channel, the presence of the control signal does not produce noise in the audio output.

It may be also be appreciated that since in the system of the invention a number of different program signals are recorded on the disc, specific information recorded on the video disc can be reproduced by a user in a variety of sequences or modes merely by selecting a desired program. It is noted in this case that when a long program signal is divided into program segments which are then recorded in different tracks on the disc, the capacity of the memory provided in the video disc recording and reproducing system of the invention can be reduced. It is also noted that when two memories are provided in the system and are alternately used, reproduction of the information is not interrupted in reading the program in the memory from both the memories.

Figure 5:
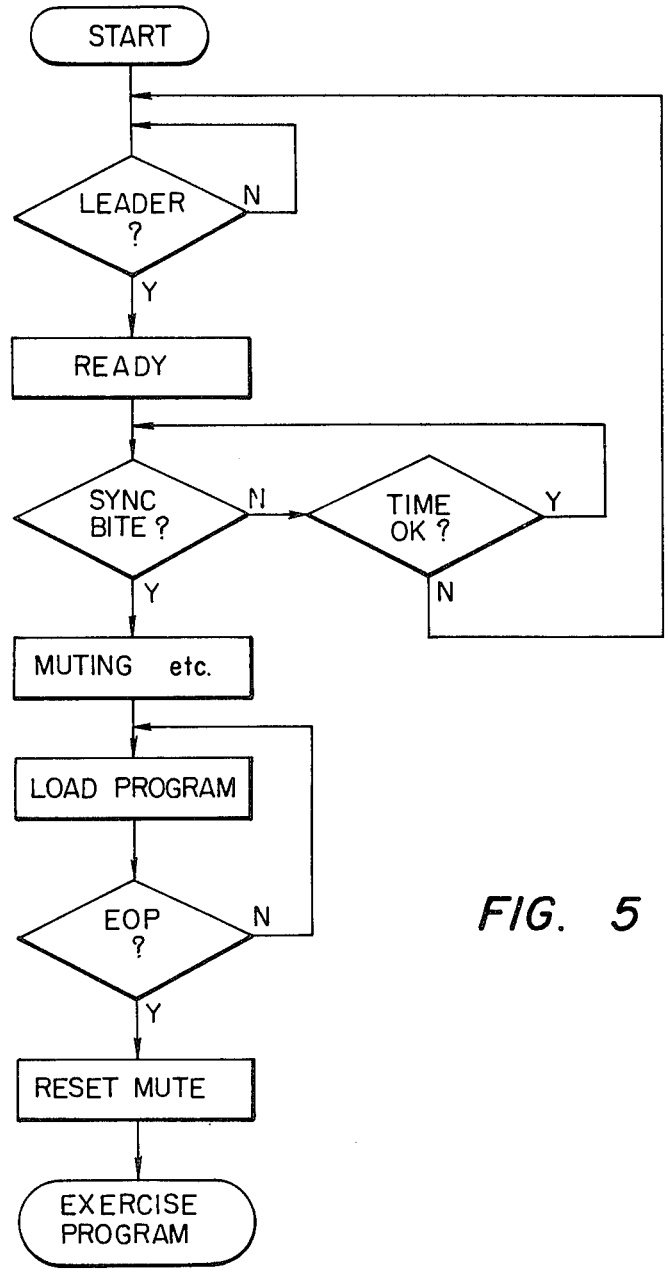
FIG. 5 is a flow chart showing processing steps of a central processing unit used in one embodiment of the invention.

If desired, the signal detection timing circuit 19 can be implemented with a microcomputer, specifically, a microcomputer central processing unit. In such a case, the sequence of program steps for operating the central processing unit are shown in the flow chart of FIG. 5.

What is claimed is:

1. A video disc recording and reproducing system comprising:
   (a) a video disc for recording frequency-multiplexed video and audio signals recorded on said video disc in two channels thereon and control signals including program signals partly substitutes for a portion of said audio signals; and
   (b) a video disc player including:
      (i) demodulator circuits for demodulating said video and audio signals recorded on said video disc and outputting said video and audio signals to respective output terminals thereof;
      (ii) a central processing unit for demodulating said audio signal for detecting said control signal recorded on said video disc from a signal supplied on an output terminal of one of said demodulators;
      (iii) a manually-operated switch connected to selectively supply and inhibit supply of said signal supplied on said output terminal to said central processing unit and to a respective one of said output terminals;
      (iv) a memory for storing said control signal, said central processing unit controlling said memory to store said control signal when said central processing unit detects said control signal and reproducing said video and audio signals from predetermined locations corresponding to the control signal thus stored in a predetermined sequence, at a predetermined time and in a predetermined mode;
      (v) means for inhibiting the supply of the output from said audio signal demodulator circuit connected to said central processing unit to said audio signal output terminals thereof when said central processing unit has detected said control signal; and wherein said video disc partly records said control signal only in the channel of said one audio signal, and said video disc player outputs said audio signal of the other channel instead of said audio signal of the one channel to said audio signal output terminals thereof when said central processing unit has detected said control signal.

2. A video disc recording and reproducing system comprising:
   a video disc for recording frequency-multiplexed video and audio signals thereon, said audio signal is partly substituted by control signals including a plurality of program data signals in a waveform of a combination of two different frequency sinusoidal signals located at predetermined portion on said disc;
   a video disc player including;
   demodulator circuits for demodulating said video and audio signals together with said plurality of program data signals recorded on said video disc and outputting demodulated video and audio signals to output terminals thereof;
   a central processing unit for controlling the operation of said system in response to stored program data consists of series of instruction signals, said central processing unit further separating said plurality of program signals from said demodulated audio signals supplied by said demodulator circuits;
   a memory means for storing said prurality of program data signals separated by said central processing unit as said stored program data for providing said instruction signals to said central processing unit;
   switching means for preventing said output terminal from being supplied demodulated audio signal when said central processing unit is separating said plurality of program signals.

3. The video disc recording and reproducing system as claimed in claim 2, wherein said program signal includes a different program signal read inhibit command.

4. The video disc recording and reproducing system as claimed in claim 2, wherein a series of said program signals are divided into a plurality of program segments which are recorded in different locations on said video disc.

5. The video disc recording and reproducing system as claimed in claim 4, wherein the preceding program segment of said series of program signals thus divided includes position information on said video disc on which the subsequent program segment of said series of program signals thus divided is recorded.

6. The video disc recording and reproducing system as claimed in claim 2, wherein said video disc player further includes means for inhibiting the supply of the output from said audio signal demodulator circuit connected to said central processing unit to said audio signal output terminals thereof when said central processing unit has detected said control signal.

7. The video disc recording and reproducing system as claimed in claim 2, wherein said audio signals are recorded on said video disc in two channels.

8. A video disc recording and reproducing system as claimed in claim 2, wherein said video disc player further including a manually-operated switch connected between said demodulator circuit and said central processing unit to selectively supply and inhibit supply of said demodulated audio signal supplied on said output terminal to said central processing unit and to a respective one of said output terminals.

9. A video disc recording and reproducing system as claimed in claim 2, wherein said control signal further includes a marker signal located immediately before said program signal for detecting said program signal.

* * * * *